United States Patent
Hallock et al.

(10) Patent No.: US 6,588,371 B2
(45) Date of Patent: Jul. 8, 2003

(54) HIGH DENSITY HOUSING FOR AQUATIC ANIMALS

(75) Inventors: William J. Hallock, Hazleton, PA (US); William R. Thomas, Conyngham, PA (US)

(73) Assignee: Thoren Aquatic Systems, Inc., Hazleton, PA (US)

( * ) Notice: Subject to any disclaimer, the term of this patent is extended or adjusted under 35 U.S.C. 154(b) by 0 days.

(21) Appl. No.: 09/970,003

(22) Filed: Oct. 3, 2001

(65) Prior Publication Data

US 2002/0066414 A1 Jun. 6, 2002

Related U.S. Application Data

(63) Continuation of application No. 09/434,644, filed on Nov. 5, 1999, now Pat. No. 6,305,324.

(51) Int. Cl.$^7$ ............................................. A01K 661/00
(52) U.S. Cl. ...................................... 119/248; 119/456
(58) Field of Search ................................ 119/248, 245, 119/456, 228, 264, 250, 251, 246, 452, 455, 458, 673, 479, 480, 249, 259

(56) References Cited

U.S. PATENT DOCUMENTS

| | | |
|---|---|---|
| 460,809 A | 10/1891 | Gunther |
| 475,082 A | 5/1892 | Gunther |
| 1,528,179 A | 3/1925 | Baldridge |
| 3,638,616 A | 2/1972 | Carmouche ............... 119/261 |
| 3,828,732 A | 8/1974 | Hill et al. ................... 119/458 |
| 3,883,148 A * | 5/1975 | Miller ........................ 105/358 |
| 3,924,571 A | 12/1975 | Holman ...................... 119/419 |
| 3,927,539 A * | 12/1975 | Harkison ................. 68/205 R |
| 4,147,131 A | 4/1979 | Walker .......................... 119/5 |
| 4,343,261 A | 8/1982 | Thomas ....................... 119/15 |
| 4,402,280 A | 9/1983 | Thomas ....................... 119/15 |
| 4,448,152 A | 5/1984 | Niki |

(List continued on next page.)

FOREIGN PATENT DOCUMENTS

| | | |
|---|---|---|
| CH | 476 455 | 8/1996 |
| FR | 2724122 | * 3/1996 |
| GB | 2 232 862 | 1/1991 |

OTHER PUBLICATIONS

European Search Report dated Mar. 28, 2001.
Aquatic Laboratory Research Systems [brochure], Marine Biotech, Inc., Beverly, Mass. 01915 [undated].
*The Zebrafish Book*, 3$^{rd}$ Ed. 1995, Monte Westerfield, Institute of Neuroscience, University of Oregon, Eugene, Oregon 97403.

*Primary Examiner*—Yvonne Abbott
(74) *Attorney, Agent, or Firm*—Duane Morris LLP

(57) ABSTRACT

A housing system for aquatic animals has a shelf-like rack holding tiers of individual tanks or aquariums (aquaria), each removably suspended from structural members that engage flanges of the tanks. The tanks are tilted inwardly of the rack and have covers with fittings on the higher or outer side, that intercept flow between a supply and a drain to inlet water when the tank is in the rack and to recycle the water at any tank position that is unoccupied. The inside bottom of each tank is contoured, for example with a longitudinal trough, so sediment collects at a low spot on the lower or inner side, where a drain inlet is placed to provide a drainage outlet that opens at a velocity increasing restriction at which sediment is entrained. The drain has a spring biased valve that opens the drain only when the tank is fully inserted in the rack. Water supply, water drain and air supply conduits are integrated using an extrusion or multiple passage conduit for air supply, water supply and water return at the interception point of the tank water inlet. The housing system is apt for zebrafish for laboratory experimentation.

24 Claims, 9 Drawing Sheets

U.S. PATENT DOCUMENTS

| | | | |
|---|---|---|---|
| RE32,113 E | 4/1986 | Harr | 119/15 |
| 4,690,100 A | 9/1987 | Thomas | 119/15 |
| 4,807,565 A | 2/1989 | Hawthorne | 119/262 |
| 4,998,506 A | 3/1991 | Frostad | 119/475 |
| 5,014,647 A | 5/1991 | Woltman | |
| 5,042,425 A | 8/1991 | Frost, Jr. | 119/5 |
| 5,044,316 A | 9/1991 | Thomas | 119/15 |
| 5,140,855 A | 8/1992 | Gruber | 73/432.1 |
| 5,148,771 A | 9/1992 | Schuett et al. | 119/479 |
| 5,174,239 A | 12/1992 | Sato | 119/5 |
| 5,197,409 A | 3/1993 | Hammond | 119/267 |
| 5,197,627 A * | 3/1993 | Disabato et al. | 220/23.83 |
| 5,228,999 A | 7/1993 | Yang | 210/615 |
| 5,365,886 A | 11/1994 | Frost, Jr. | 119/267 |
| 5,413,070 A | 5/1995 | DeWalt | 119/247 |
| 5,450,818 A | 9/1995 | Caillouet | 119/223 |
| 5,474,024 A | 12/1995 | Hallock | 119/17 |
| 5,513,596 A | 5/1996 | Coiro, Sr. et al. | 119/457 |
| 5,640,930 A | 6/1997 | Kirby | 119/263 |
| 5,783,070 A | 7/1998 | Lee | 210/169 |
| 5,823,144 A | 10/1998 | Edstrom, Sr. et al. | 119/475 |
| 5,849,185 A | 12/1998 | Judy, Jr. | 210/169 |
| 6,125,791 A | 10/2000 | Gundersen et al. | 119/228 |

\* cited by examiner

HIGH DENSITY HOUSING FOR AQUATIC ANIMALS

CROSS REFERENCE TO RELATED APPLICATION

This is a continuation of application Ser. No. 09/434,644, filed Nov. 5, 1999, now U.S. Pat. No. 6,305,324, granted Oct. 23, 2001.

FIELD OF THE INVENTION

The invention relates to animal housing systems, and more particularly provides a housing system for aquatic animals wherein covered tanks or aquaria are removably carried in tiers on a shelf-like rack. Insertion of a tank into the rack couples the tank to a circulating water supply and preferably also to a supply of compressed air for aeration of the water. Removal of a tank from the rack decouples that tank from the circulating supply, also removing the tank as an interruption of the circulation whereby circulation continues. The housing system is especially useful as a high density laboratory facility for Danio Reria (zebrafish) used in medical and genetic testing and the like, or being bred for such use, and also is applicable to pet stores, tropical fish hobbyists and the like.

BACKGROUND OF THE INVENTION

Sophisticated high density arrangements for the dry-housing of animals are known, in particular for mammalian laboratory animals such as mice, rats, rabbits, for breeding such animals, etc. A number of interests affect the design of animal housing systems. The welfare of the animals is a major concern, making it necessary to supply the animals with basic requirements of air, water and food. The animals must be sheltered if possible from diseases or parasites and also should be protected from unnecessary stress. It is advantageous to facilitate quick and convenient access to the enclosures containing the animals for providing services. In laboratory applications, those conducting lab tests need access to the animals to initiate testing, and means to observe or measure the effects. In other situations such as pet stores and hobbyists' installations, the animals also need to be accessible yet protected and in view.

Without compromising other interests, an optimal housing arrangement should be compact, namely the density of the animal population should be high. It should be neat and clean. It should be readily capable of occupying the same floor space as the humans that are providing services and/or conducting testing. The maintenance and use of the system should maximize comfort and minimize danger for both the animals and the humans, for example not only preventing potential catastrophe such as the transfer of a deadly disease, but also avoiding simple discomforts such as unpleasant odors or dispersion of allergens.

Some animals used in laboratory experiments, like rare pets, can represent a substantial investment. Rare pets are expensive to acquire, as are certain laboratory animals such as those having specific genetic characteristics or propensities that are useful for testing. Apart from the cost of the animals, the time and effort invested to carry on an experiment makes it important that most or all of the animals survive for the duration of the experiment. It is important that the animals stay healthy while housed and also that their management and upkeep be as convenient as practicable.

Examples of high density housing for mammals such as mice are disclosed, for example in U.S. Pat. No. Re.32,113—Harr (Air conditioned laboratory rack for animal cages); U.S. Pat. No. 4,690,100—Thomas (Ventilated animal housing and service system with cage filter covers); U.S. Pat. No. 5,044,316—Thomas (Ventilated animal caging system with cage racks and filter covers including valves operable by rack); U.S. Pat. No. 5,474,024—Thomas (Caging system with slide bar operator for quick disconnect water fitting), and others. The disclosures of these patents are incorporated for their teachings regarding high density housing and protection from disease while supplying animals with the necessities of life.

Several of the foregoing patents use covers on animal cages to protect the occupants from airborne pathogens when the cages are removed from the rack. The "cages" are actually integrally hermetic transparent plastic boxes, closed on the bottom and sidewalls, and closed over the top by the cover. These cages are engaged against hollow shelves in the rack, subdivided internally to define air supply and exhaust conduits. The supply and exhaust conduits both have orifices placed to open into cages carried on one or both sides of the rack, such that the internal volume of the cage box becomes a part of an air flow path from the supply duct to the exhaust duct.

Various apparatus for supplying utilities such as food, water, and air to housings for laboratory animals are known in the art of laboratory animal housing of the type used for lab mice, etc. For example, U.S. Pat. No. 5,513,596 discloses a quick disconnect water supply assembly for removably coupling cages to a drinking water supply. A conduit is mounted to pass through the barrier defined by a wall of the cage box, and contains an occupant-operated valve. The water supply assembly couples into a water supply line when the cage is inserted into the rack. A linking member attaches to the water line for opening or closing the connection with the water line and a manually movable knob is operated to engage or disengage the cage with the water supply. The connection closes off the water supply when the cage is withdrawn from the cage rack system.

The drinking water supply as described is substantially a one way affair, namely with water flowing from the supply into the cage enclosure without a flow return. U.S. Pat. No. 5,174,239 discloses an aquarium device that is sealed and coupled to water fed under pressure into the aquarium body by a feed pump. The water pressure resulting from the pump causes used water in the aquarium body to be discharged through a drain pipe. The drain pipe is coupled to a filtration and aeration unit that leads into the feed pump, providing a closed circulation path including the aquarium volume and the filter/aerator in a closed loop. A closed loop filtration device for each aquarium is the normal filtration arrangement in a multiple-aquarium installation. Although many aquarium tanks may be disposed in relative proximity, each one has its own separate water pump and water filter, which arrangement avoids a sharing of water that might engender the spread of disease. Aeration supplies on the other hand are typically commonly coupled to flow lines leading into a number of tanks. No return is needed because the air discharge is by bubbling into the ambient air.

U.S. Pat. No. 5,042,425 discloses an aquarium and bird and animal containment system. The containment system includes racks for displaying one or more aquariums and racks for displaying bird and animal cages. A cabinet disposed between the aquarium support and the bird and animal support contains a sink, a water supply bringing water to the tanks and cages, and an air supply and distribution system bringing air to biological filters located in the aquarium tanks. An drain system carries away overflow water.

U.S. Pat. No. 5,197,409 discloses an aquatic tank display system suitable for use in a pet store or aquarium. The system includes a tank support frame having multiple tiers or levels for supporting tanks at different elevations. Portions of the frame are made of a non-corrosive material, because it is possible that areas around the tanks may get wet, and are non-conductive for avoiding electrical hazard. Each tank has an open top which is covered by a lamp fixture and a hinged lid.

U.S. Pat. No. 5,413,070 discloses a multiple tank display for a pet store or the like, comprising supports defining vertically spaced tiers. The tanks have transparent walls and those in the top and bottom tiers have front walls that are inclined to refract light and enhance viewing by a person standing in front of the display.

U.S. Pat. No. 5,365,886 discloses an aquarium containment system. Racks support multiple stacked sets of tanks and each rack has a removable lighting system. An automatic water distribution system is provided for the aquariums, including mechanical and biological filters and heaters. Sliding access panels facilitate access to the tops of the tanks for maintenance and cleaning purposes.

A problem encountered when using circulating water to supply aerated and/or filtered water to multiple tanks is that the water for all the tanks can be contaminated by pathogens originating in one of the tanks. As a result, a circulating water system may be disadvantageous. On the other hand, having a single filtration and distribution system serving a number of tanks has obvious conveniences and cost savings. A disease problem of a similar type is encountered with mammal cage systems in that airborne dander from one cage can spread pathogens to other cages. Uncovered cages can release dust and dander on small particles that move about with eddy currents in the exhaust ducts when the cages are in the rack and elsewhere when the cages are out of the rack. Problems with this airborne vector can be partially dealt with by enclosing each of the cages by a cover that comprises a filter panel to block passage of dust and dander into or out of the cages, particularly when the cages are withdrawn from the rack system. However the cages must be opened to the air for service.

Removing the cages from the rack exposes the orifices to the air supply and exhaust openings to the air. Dust and dander can become entrained in the air moving about in the ducts in a manner similar to the way in which water borne diseases may move about in a circulating water system. Moreover, in a circulating water system one cannot simply disengage a tank from the system because the water otherwise supplied to the removed tank would be discharged onto the rack, floor or other tanks.

Leakage and inadvertent water discharge can be a problem in water tank housing. Apart from spillage, temperature and humidity constraints can make the air around a tank system uncomfortable for humans. Different types of fish require water at different temperatures. For zebrafish, the water should be maintained at about 85* F. for optimum health and breeding conditions (specifically 25 to 31* C. or 77 to 87.8* F.). This is higher than room temperature, leading to high humidity levels, condensation of water on relatively cooler surfaces, and dripping water that may damage components of the housing, spread disease and create unpleasant working conditions for the humans that are involved.

There is a need for a housing system for fish that solves the foregoing problems and optimizes conditions of comfort and safety for aquatic animals and for people. Additionally the system should be convenient and inexpensive. Optimally, such housing is characterized by high animal density, that is, both housing a large number of fish or other aquatic animals in a relatively small volume of well serviced water, and also supporting the tanks or similar enclosures that hold the water in a very compact and space saving arrangement.

SUMMARY OF THE INVENTION

A high density housing system for aquatic animals according to the invention uses a number of individual tanks or aquaria that are suspended at a tilt angle by structural members of a rack. Specifically, these structural members comprise lateral support beams carried on longitudinal support rods that are in turn supported, for example, by panels at the opposite ends of the rack structure. Flanges are provided around the open tops of the tanks, which tank flanges are supported by complementary flanges of the lateral support beams of the rack. The flanges of the support beams are inclined downwardly and inwardly relative to the rack, thus tilting the supported tanks inwardly. Each tank is provided with a bottom structure that has inner walls having sloping sides leading to a low point at which sediment is collected for discharge with drained water. For example, the bottoms of the tanks can form troughs parallel to the flanges and parallel to the lateral support beams. The troughs lead to a lowest point at the inward end of the trough, due to the inward sloping support of the tanks and the bottom trough. Other arrangements are also possible, characterized by the gradient around the bottom of the tank leading to a low point from which water is drained.

A modified recirculating parallel-flow water system continuously supplies filtered water to all of the tanks. The tanks are removably coupled in a parallel flow arrangement between common supply and drain conduits in which supply and drain water flow serially. When inserted into the rack, each tank intercepts one of a number of parallel flow paths provided at spaced positions, one position per tank, between the common supply conduit and the common drain conduit. With the tank inserted, purified supply water flows into the tank from the supply conduit, and used tank water is extracted and drained from said lowest point along the bottom of the tank, from which the water flows into the drain.

When the tank is removed from the rack, namely by withdrawing the tank along the supporting flanges of the lateral support beams, the flow from the supply water conduit to the drain conduit is not intercepted at the respective tank position, and flows directly from the source to the drain. The water flows in a completely closed circuit, passing a filtration and purification system and passing through those tanks that are inserted to intercept flow of water from the source conduit to the drain conduit at each of those tanks' positions. The water supply and water return conduits or lines can be formed integrally with or rigidly attached to the rack to provide structural support for the lateral beams. The water supply lines are preferably formed integrally with multiple lumen extrusions in which the parallel flows at the tank positions are between a supply lumen and a drain lumen. A third lumen is coupled to the tank by a spring biased ball valve supplying air to bubble through and aerate the water in each aquarium when the tank is inserted, said ball valve being closed when the tank is removed from the rack.

According to an aspect or the invention, water supply, water drain and air supply conduits are integrated into an aquarium supporting rack, for supply and removal of water to covered aquarium tanks, and for supply of air for aerating the water. The tanks and conduits are structured such that each tank engages with the conduits by intersecting water flow paths running in parallel, and by a valved connection to a serial air supply, such connections being made only when an aquarium is in a supported position on the rack. Thus detachment of any or all of the tanks does not interfere with the re-circulating water system, which continues to flow in a closed loop.

In a preferred embodiment, when the tank is inserted and intercepts flow from the supply conduit to the drain conduit, the water drained from the tank flows from a lowermost point at the lower end of the tank (which tilts inwardly due to the tilting flanges of the lateral support beams) into a central longitudinal drain path provided at each level or tier. When the tank is removed, however, the applicable drain conduit is a drain part of the multiple lumen extrusion, which is at the higher side of the tilting tanks in the respective tier, spaced laterally outward from the longitudinal center. In any event, neither the air nor the water facilities provide a pathway by which pathogens can pass from one aquarium to another. The filtration and purification portion of the circulating water system preferably include filtering of solids (e.g., with a diatomaceous element), removal of oils and volatile components (e.g., with an activated charcoal element) and a biocidal/algaecidal element (e.g., an ultraviolet lamp incident on a quartz tube section along the water flowpath, to destroy any living tissue).

According to another aspect, the drainage from each tank inserted in the rack is provided via a drainage conduit extending from the lowermost point on the bottom, where sediment settles, substantially to the water fill level on the laterally inward end of the tank, where the drainage conduit opens to the longitudinal drain trough. Advantageously, a restricted gap constricts flow from the tank into the drainage conduit at the lowermost elevation point in the tank, associated with a sump channel leading to the lowermost point. Drainage flow passing through the restricted gap at the low point increases in velocity due to the restriction and thereby entrains and sucks out sediment that has settled. In this way the tank water remains relatively clean without substantial intervention. The drainage conduit has a spring biased valve that is opened by contact with a portion of the rack when the tank is inserted into the rack. As a result, when the tank is extracted from the rack, the drainage conduit is closed, preventing sloshing of water from the drainage conduit opening at the water level on the lower side of the tilted tank. When the tank has been removed, it can be held level manually rather than tilted, or can be placed on a horizontal surface. Whereas the tank is then level rather than tilted, the water level in the tank resides lower than the drain outlet, further avoiding leakage.

BRIEF DESCRIPTION OF THE DRAWINGS

These and other features and advantages of the present invention are more fully disclosed or made apparent to a person of ordinary skill by the following detailed description of the preferred embodiments and examples of the invention, which are to be considered together with the accompanying drawings wherein like numbers refer to like parts and wherein.

DETAILED DESCRIPTION OF THE PREFERRED EMBODIMENTS

Figure 1:
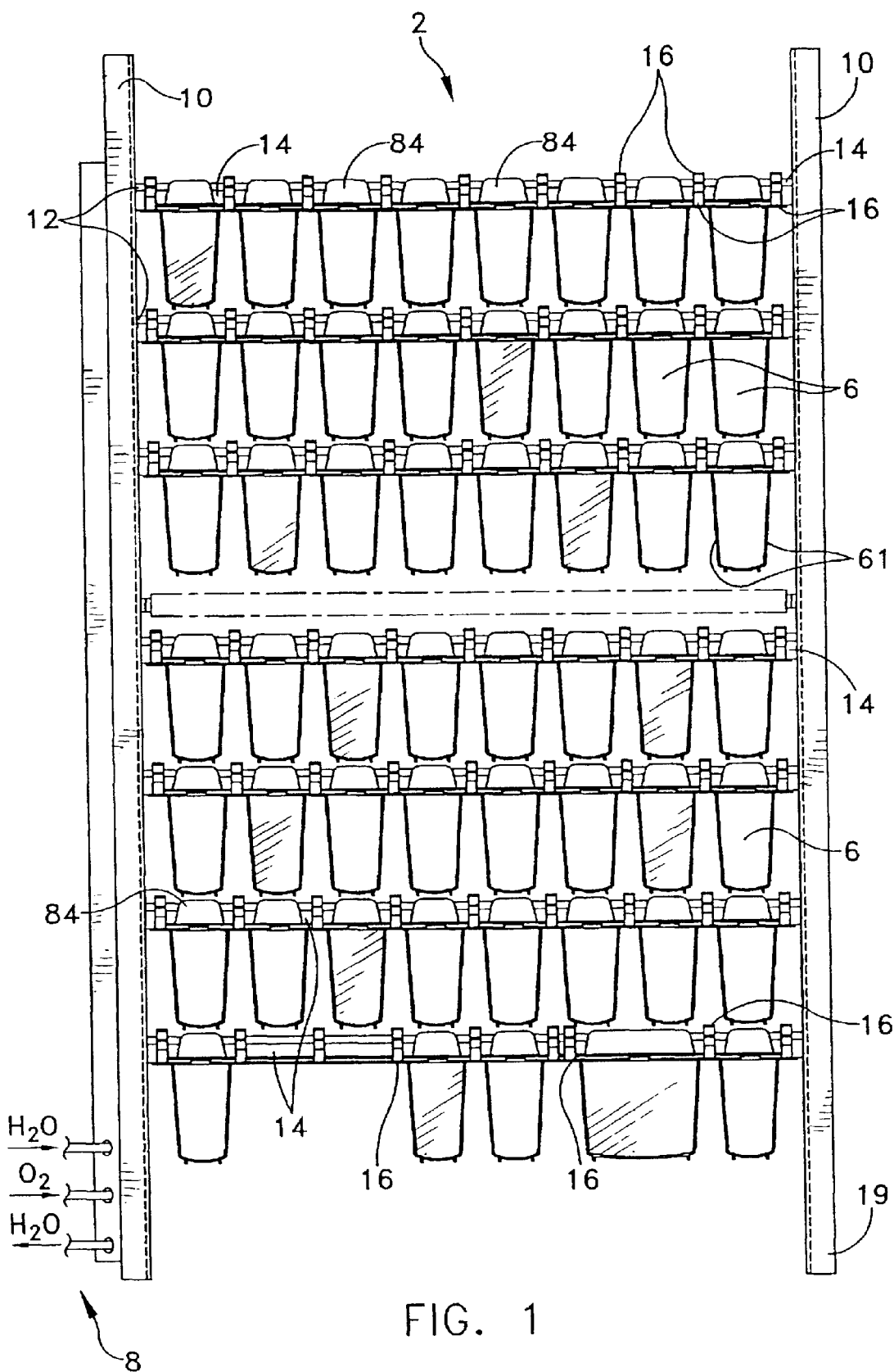
FIG. 1 is a front elevational view of a high density housing array in accordance with the invention.

This description of preferred embodiments is intended to be read in connection with the accompanying drawings, which are to be considered part of the entire written description of this invention. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 2:
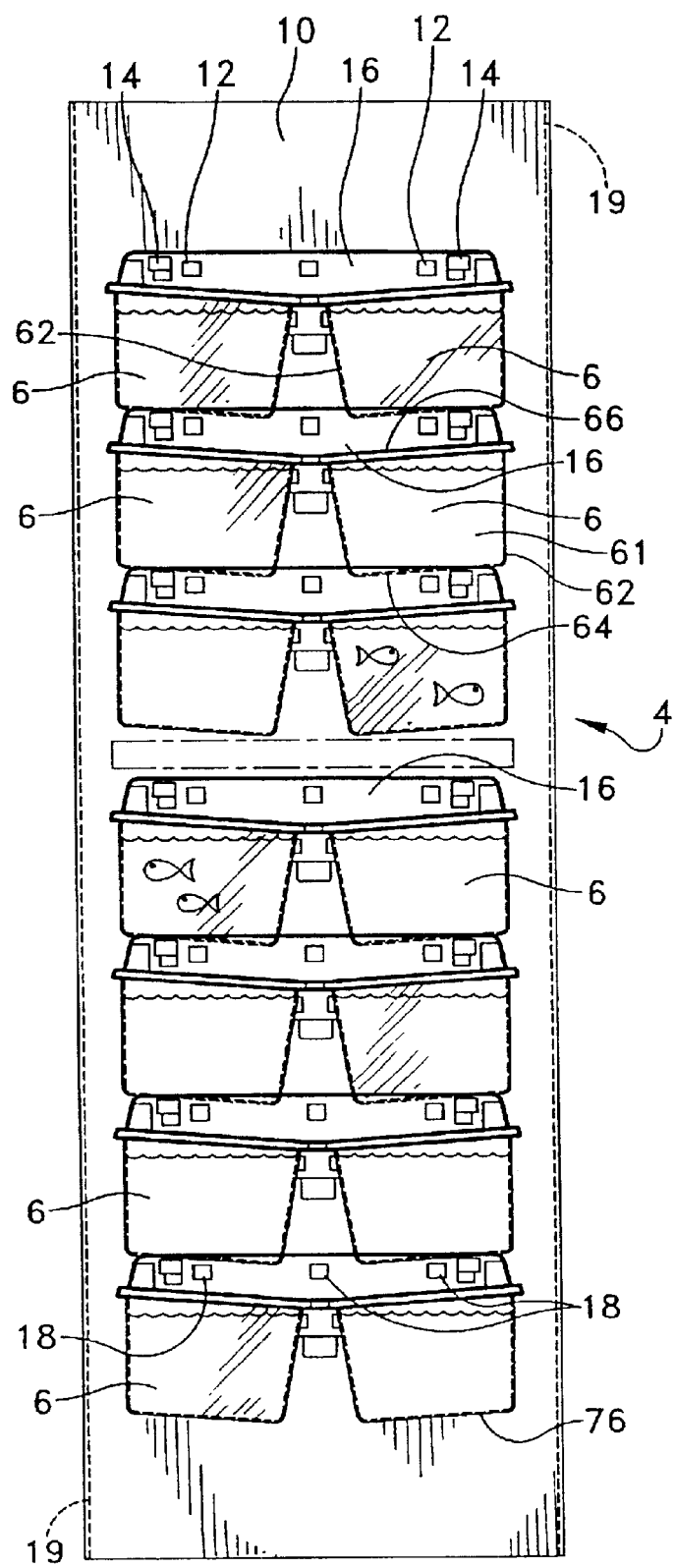
FIG. 2 is a side elevational view of the high density housing as shown in FIG. 1.

As shown in throughout the drawings, the invention generally comprises a high density housing structure 2 for aquatic life, including a rack 4, a plurality of aquarium tanks 6, and a water circulation system 8 (See especially FIGS. 1 and 2). More particularly, rack 4 comprises a pair of end walls 10, a plurality of longitudinal support beams 12, a plurality of air and water supply conduits 14, and a plurality of tank hangers 16 that form lateral support beams. End walls 10 may be formed as integral sheets of structurally rigid material or may comprise a matrix of legs, trusses or similar structural elements, arranged so as to form a supporting wall at the ends of rack 4. It is also possible that similar vertical structural members could be provided at points spaced inwardly from the longitudinal ends.

In the embodiment shown, end walls 10 define a plurality of openings 18 that are sized and shaped to accept an end portion of longitudinal support beams 12. Means for stabilizing end walls 10 in an upright position can be provided, such as outwardly projecting wings 19 as shown, or base members such as feet (not shown) that cause the end walls 10 to encompass a length and width, for stability.

Figure 3:
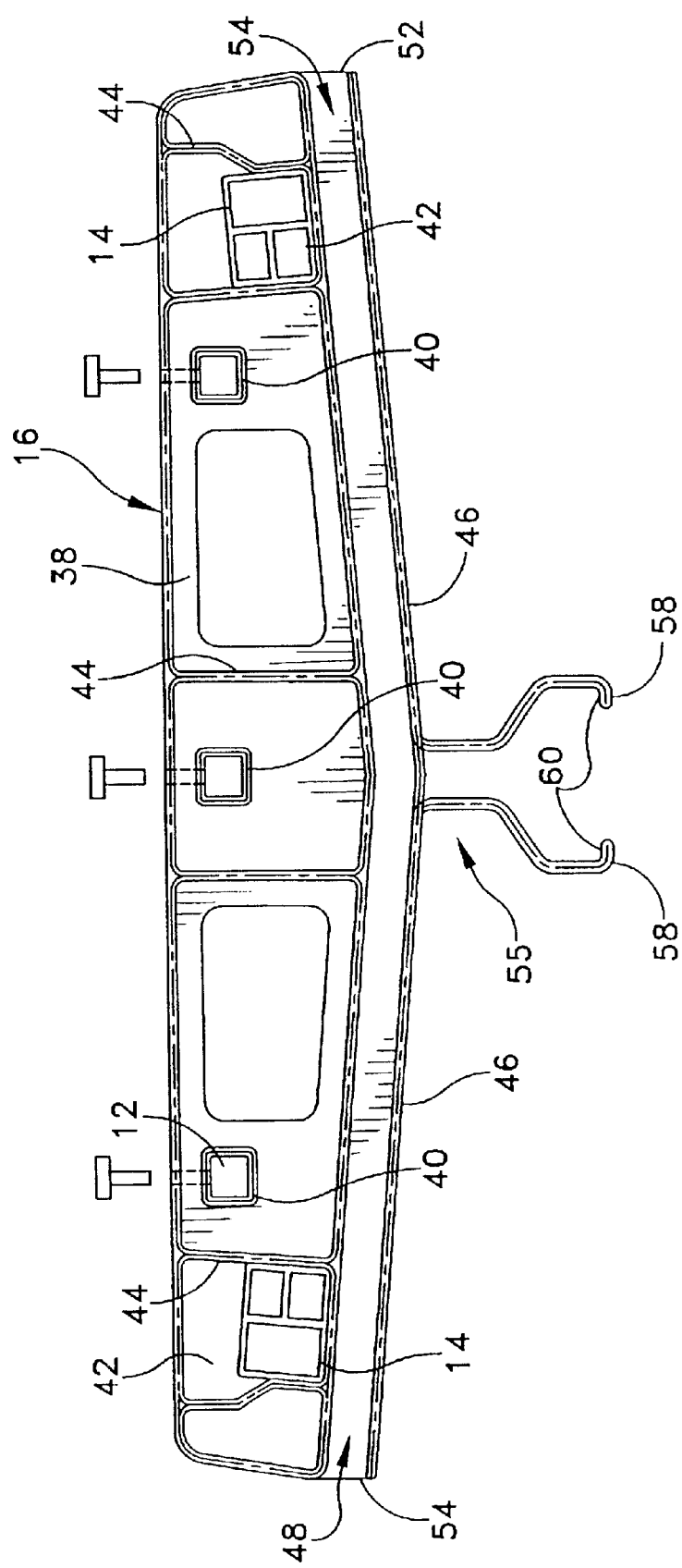
FIG. 3 is a front elevational view of a lateral support or tank suspension arm.

Support beams 12 comprise elongated structural members (see also FIG. 3), having a plurality of aligned, equally spaced attachment points, such as spaced vertical holes defined on a top side. In one embodiment of the invention, support beams 12 are of metal tubing having a square or rectangular cross-sectional shape, for example a square tubing one inch (2.5 cm) on a side. At least one support beam 12 at the rear or rack side of the tanks is also provided at each vertical level or tier, with a plurality of relatively narrow rods or valve operator pins 21 (FIGS. 4, 9) that project laterally outwardly, perpendicular to the longitudinal axis of the beam. The evenly spaced attachment points are located between cage positions. The rods are provided at each cage position, as valve operator pins 21, discussed in more detail below.

The air and water supply conduits 14 comprise tubular members defining the flowpaths for air and water. Preferably, conduits 14 comprise an integral extrusion with multiple distinct lumens for air supply, water supply and water drainage. Thus conduits 14 each have individually defined and mutually segregated internal passageways extending along their length. In one embodiment of the invention, air and water supply conduits 14 have a square or rectangular cross-sectional shape. A plurality of openings 25 are defined in a side wall of each air and water supply conduit 14 so as to provide access to a fresh water supply passageway 26, a pressurized air supply passageway 27, and a drain or waste water removal passageway 28. At least one internal wall of each air and water supply conduit 14, that defines the passageways 26, 27, 28 also includes at least one opening (e.g., 32, 33 in FIG. 10) arranged to communicate with the interior of each aquarium tank 6, via water circulation system 8, when that tank 6 is in place in the rack.

Tank hangers 16 each comprise a generally rectilinear structural support element having a central web 38 and a plurality of transversely defined openings 40 and 42. The transversely defined openings 40 are sized and shaped to accept a portion of support beams 12 and openings 42 are sized and shaped to accept a portion air and water supply conduits 14, the beams and conduits 12, 14 forming longitudinal elements and the lateral tank hangers 16 forming lateral elements coupled to the longitudinal elements to provide a supporting rack. These elements need to be sufficiently heavy to bear the load of the aquarium tanks when they are filled with water, namely approximately 62 lbs. per cubic foot, with additional strength for purposes of durability.

Figure 4:
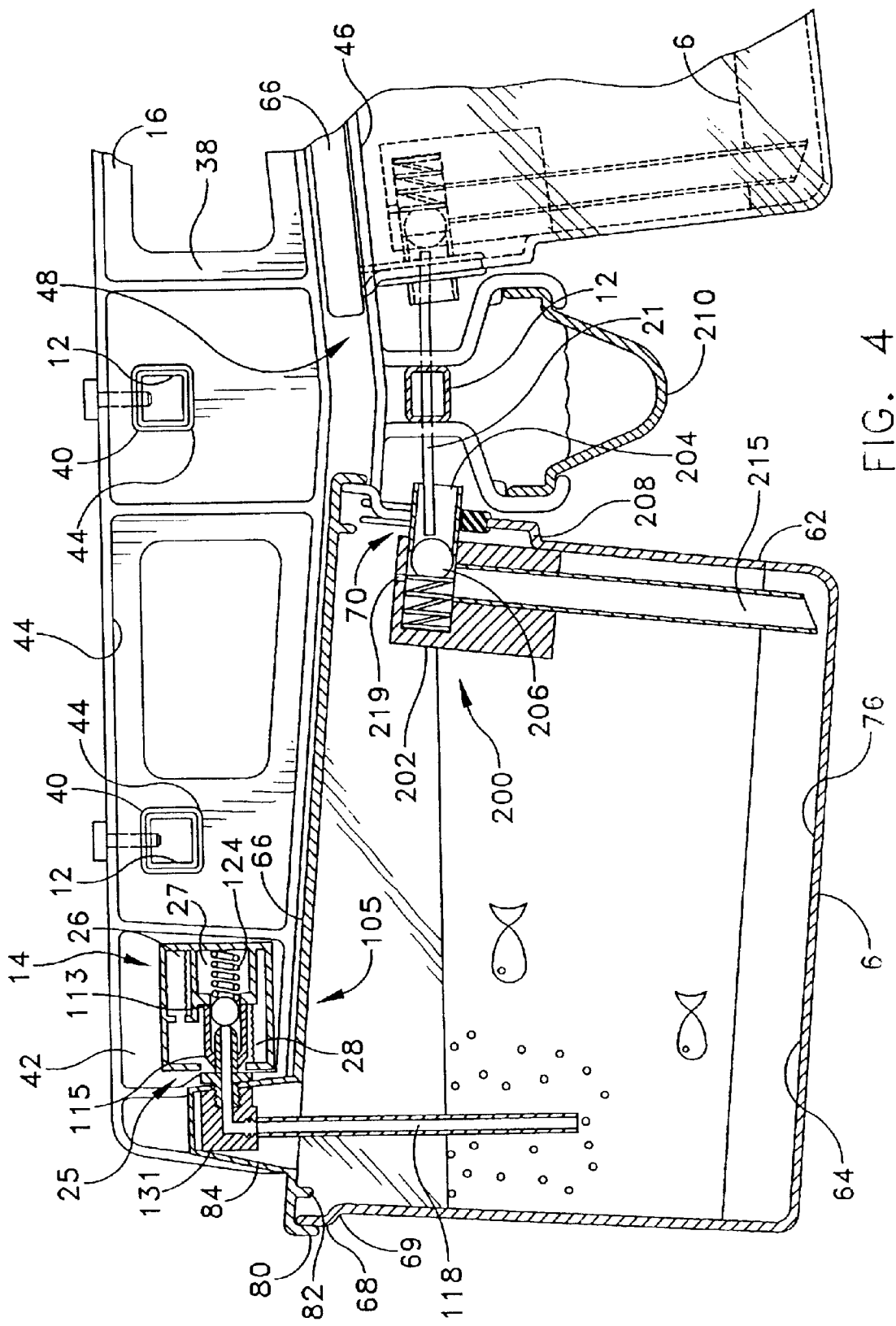
FIG. 4 is a cross-sectional view of an aquarium tank according to one embodiment of the invention.
Figure 9:
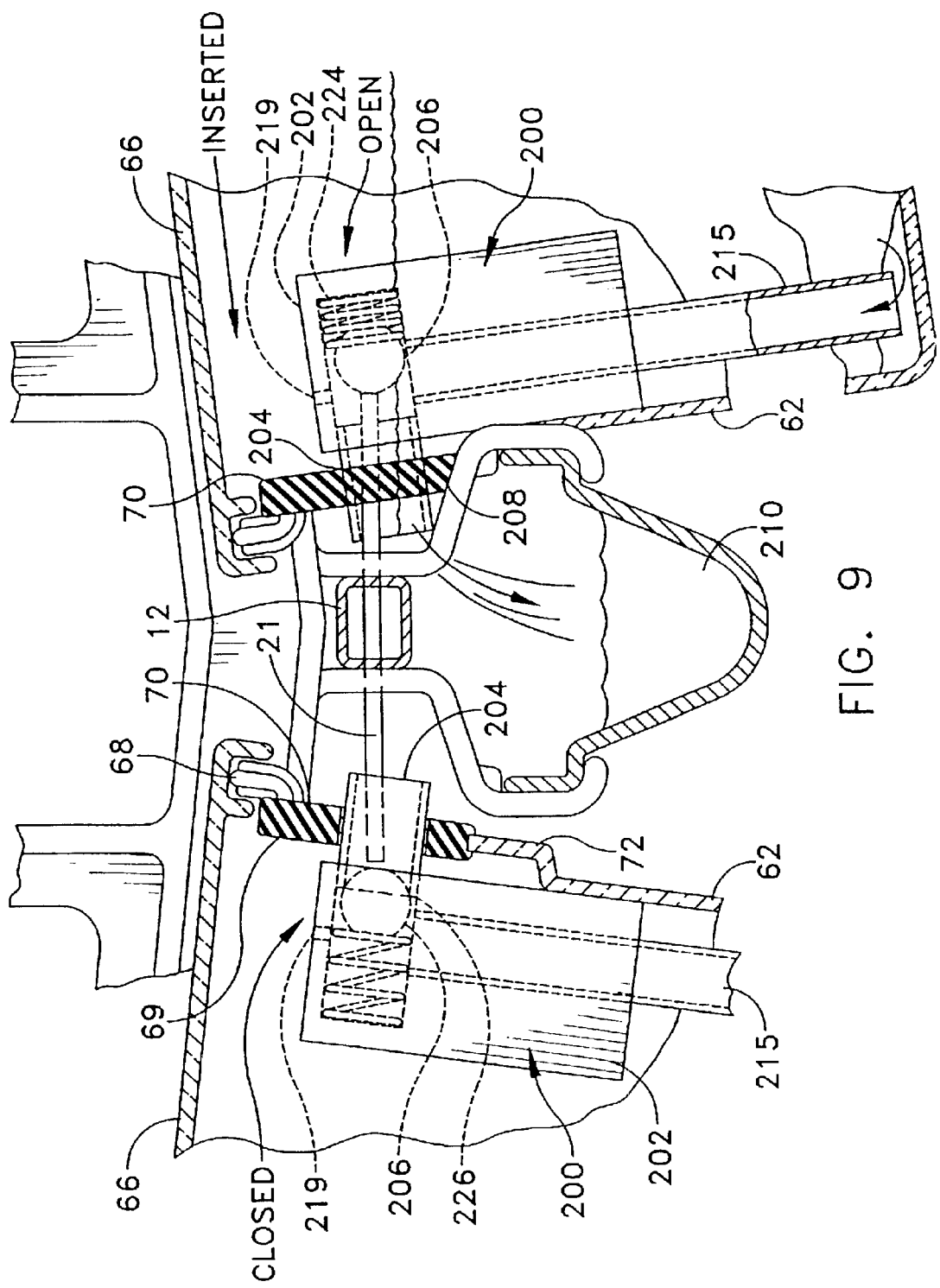
FIG. 9 is a broken away cross-sectional view of the ball valve and waste water drain of FIG. 1.

Each opening 40, 42 is surrounded by a flange 44 that projects outwardly perpendicular to central web 38 (that is in a longitudinal direction), which securely fixes the perpendicular orientation of the longitudinal and lateral parts. A peripheral flange 46 is provided along a bottom edge of tank hanger 16 in spaced relation to a bottom portion of flange 44 so as to form a channel 48 that is inclined inwardly. In an example of the invention wherein aquarium tanks are received on both sides, channels 48 are inclined inwardly from both sides, but a one-sided arrangement is also possible. As best shown in FIGS. 2, 4 and 9, channel 48 extends the length of tank hanger 16 and opens at ends 52, 54. Channel 48 is sloped downwardly from each end 52, 54 of tank hanger 16, toward a central section 55 of tank hanger 16. Thus channel 48 defines a low point at approximately the central point of tank hanger 16. A pair of brackets 58 project downwardly and outwardly from the portion of peripheral flange 46 that is adjacent to central section 55. Brackets 58 define a pair of opposed and spaced channels 60 that are sized and shaped to receive a portion of water circulation system 8, as further discussed below.

The system comprises a plurality of aquarium tanks 6, wherein a number of fish or other aquatic animals can be housed. The tanks can separate the fish, for example, to segregate breeding fish, to protect certain fish (e.g., fry) from predation, to contain a group of fish that have been subjected to an experimental procedure or perhaps are a control group, to contain different species, to disperse a large number of fish throughout the volume of all the tanks, or for any other reason.

As best shown in FIGS. 1, 2, and 4, each of the aquarium tanks 6 comprises an open-topped container with a cover. In the preferred arrangement shown, the tank 6 comprises a generally frusto-pyramidal receptacle, having walls that preferably slope somewhat inwardly toward the bottom, including side walls 61, end walls 62, a bottom 64, and a cover 66. Aquarium tanks 6 shown in FIGS. 1 and 2 can be fabricated in different sizes as needed to hold a required volume of water, such as tanks holding 0.5, 1.0, or 1.5 gallons depending upon the number of fish that will be housed in the tank. It is also possible to provide single width tanks and double width tanks, the latter holding substantially twice the volume of water of the former.

A one gallon aquarium tank can readily house up to 50 fish or more, depending on the size of the fish, the rate at which necessary utilities are provided (e.g., the rate at which the water is changed or oxygenated, the amount and schedule of feeding and so forth). Preferably 5 to 50 fish of the size range of zebrafish are housed in a one gallon tank. The pump and fluid flow means should be capable of providing the equivalent of 2 to 5 tank volume changes per hour, preferably 3 to 4 tank volume changes per hour, to each aquarium. A nominal range of appropriate flow rates is 4.4 to 22 gallons per hour of water to each aquarium.

Assuming a one gallon tank and a water circulation of four gallons per tank or four changes per hour, the one gallon aquarium tank can readily house 5 to 10 fish as subjects for experimentation, or as many as 40 to 50 fish for stocking or temporary holding. With relatively greater fish density, it is advisable to employ relatively greater aeration by virtue of the air bubbling flow rate, as known in the aquaculture art. The internal volume of the aquarium can be subdivided by a barrier that confines adult fish and passes fry, to protect the fry in a breeding situation. Being smaller fish, the density of fry per unit of volume can be higher at a given oxygenation level.

It would be possible to forego the bubbling of air through the water to provide oxygenation, provided the supply water is sufficiently oxygenated and is supplied at a sufficient rate. It is preferred for safety and redundancy that the bubbling air supply be included, so that if the circulating water system is shut down for any reason or fails, the necessary oxygenation is provided by the bubbler.

Aquarium tanks 6 are preferably formed as unitary injection molded clear plastic containers. The material preferably is a high temperature polycarbonate if autoclaving will be used as a part of the tank maintenance procedure. An outwardly projecting flange 68 is formed around the peripheral edge of the open top end of each aquarium tank 6 (FIGS. 4–8). Flange 68 forms a shoulder 69 that also substantially surrounds open top end of aquarium tank 6. One of end walls 62 includes a U-shaped opening 70 that separates flange 68 and shoulder 69 at the top portion of that end wall 62. The inner edges of U-shaped opening 70 form an inwardly projecting flange that further defines opening 70.

The bottom 64 of the tank comprises inner side surfaces that slope inwardly and downwardly, preferably at a sharper angle adjacent that bottom than higher in the tank. The inwardly sloping bottom panels intersect one another to form an elongated trough or sump channel 76 extending the length of the tank. Sump channel 76 defines the lowest portion of aquarium tank 6, and in the embodiment shown is positioned centrally along bottom 64. Sump channel 76 also extends parallel to the top edge and flange 68 in the embodiment shown, such that channel 76 has a downward gradient to a point only when the tank is tilted, such as when supported in the rack. The sump channel 76 can be placed along one side or the other instead of centrally or can be diagonal or otherwise formed, and sump channel 76 can be inclined relative to the flange. Each of these structures may be arranged to provide a bottom inside contour that defines a gradient leading from all points on the bottom to a predetermined point from which sediment can be collected by appropriately locating the drain inlet. In a preferred embodiment, bottom 64 has a substantially "V" or "U" shaped cross-sectional profile parallel to the flange edge and the tank is tilted when supported in the rack, for example by about 5 degrees or an approximate slope of 1:12.

The bottom may vary in thickness in order to provide the trough shaped inside surface, but preferably the bottom has a substantially even thickness, which makes the outer side of the bottom into a V- or U-shape. To stabilize the tank when rested on a horizontal surface (FIG. 6), two elongate, mutually parallel leg ridges 88 extend longitudinally along the bottom 64 between the low point and the side walls, extending at least to the same level as the bottom of the V- or U-shape, and possibly longer, such that the tank is stable when on a horizontal surface, resting along two or three lines. In the embodiment shown, two legs 88 are provided, one adjacent to each side wall, namely at the maximum available spacing. In an alternative embodiment (not shown) the V- or U-shape can be asymmetrical such that the low point is near one side wall and only one leg is provided between the low point and the other sidewall, for support along two lines. In any event, legs 88 are arranged so that when aquarium tank 6 is removed from rack 4, it may be placed on a flat surface in an upright position without the top edge of the tank being tilted in either direction relative to the flat surface.

Cover 66 closes over the top of each tank and prevents water from dripping or sloshing into a lower tank from an upper one. Cover 66 comprises a substantially flat sheet of clear material, e.g., polycarbonate polymer, or the like, or of the same material as the tank, that is sized and shaped to close-off the open top end of aquarium tank 6. Cover 66 includes a lip 80, an anti-condensation rib 82, and an air/water supply header 84. Lip 80 projects downwardly from a peripheral edge to circumscribe the bottom surface of cover 66, and is sized to fit snugly over flange 68 of aquarium tank 6. Anti-condensation rib 82 projects downwardly from the bottom surface of cover 66, and is spaced inwardly from lip 80 so as to reside somewhat within the flange along the upper edge. Anti-condensation rib 82 is relatively narrow and protrudes from the underside of cover 66, for example by about 0.125 inches or so. Anti-condensation rib 82 can be continuous around the periphery of the lid at a position inside the flange of the tank. A jogged portion adjacent to an end of cover 66 can be included so as to provide clearance for portions of water circulation system 8 while nevertheless providing a rib all around the periphery. Rib 82 provides a low elevation point from which water that condenses on cover 66 will tend to drip back into the tank. Rib 82 is preferably placed to reside immediately adjacent to flange 68. Without such an anti-condensation rib 82, there is a tendency for condensation on cover 66 to flow between cover 66 and the flange 68 of tank 6, particularly by capillary action. The humidity inside the tank is high. The water temperature (e.g., 85 degrees F.) is higher than ambient temperature (e.g., 70 degrees), which tends to make the cover cooler than the air in the tank and produces condensation at a steady rate. The aeration bubbling also produces a positive pressure in the tank relative to ambient and these aspects can combine to cause upper tanks to drip onto lower tanks unless such a rib 82 is provided.

Cover 66 is injection molded in a particular shape to facilitate coupling of each tank to the supplies of air and water through cover 66. Air/water supply header 84 projects upwardly from the top surface of cover 66, adjacent to the outer end in the embodiment shown, and encloses or defines a void space or cavity 85. Air/water supply header 84 comprises an air bulkhead having a surface 94 that faces toward the top surface of cover 66 and a water bulkhead 92 having a surface 96 that faces toward the top surface of cover 66 (See especially FIG. 7). Surface 96 slopes away from the top surface of cover 66 at an angle greater than the tilt angle of the tank when in the rack, for example 10 degrees versus 5 degrees. As a result, surface 96 is inclined outwardly relative to vertical when the tank is in the rack. Surface 94 can be oriented substantially perpendicular to the top surface of cover 66, and therefore perpendicular to the flanges that support the tank.

Figure 5:
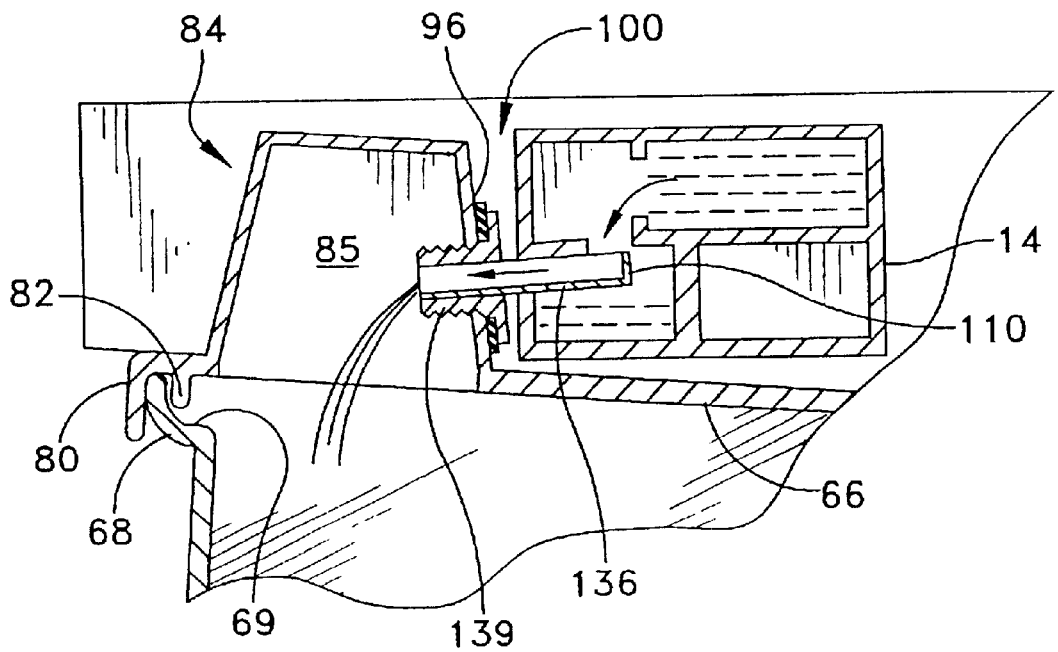
FIG. 5 is a broken-away cover of the aquarium tank shown in FIG. 1, showing a cross-sectional view of the multiple lumen air/water supply header operatively engaged with a conduit supplying air and water to the aquarium tank according to an embodiment of the invention.
Figure 6:
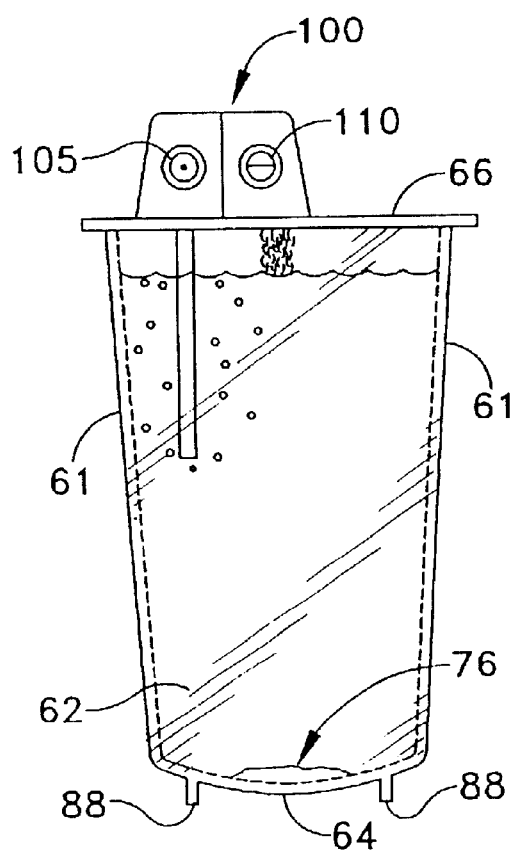
FIG. 6 is a cross-sectional view of the tank shown in FIG. 1.
Figure 7:
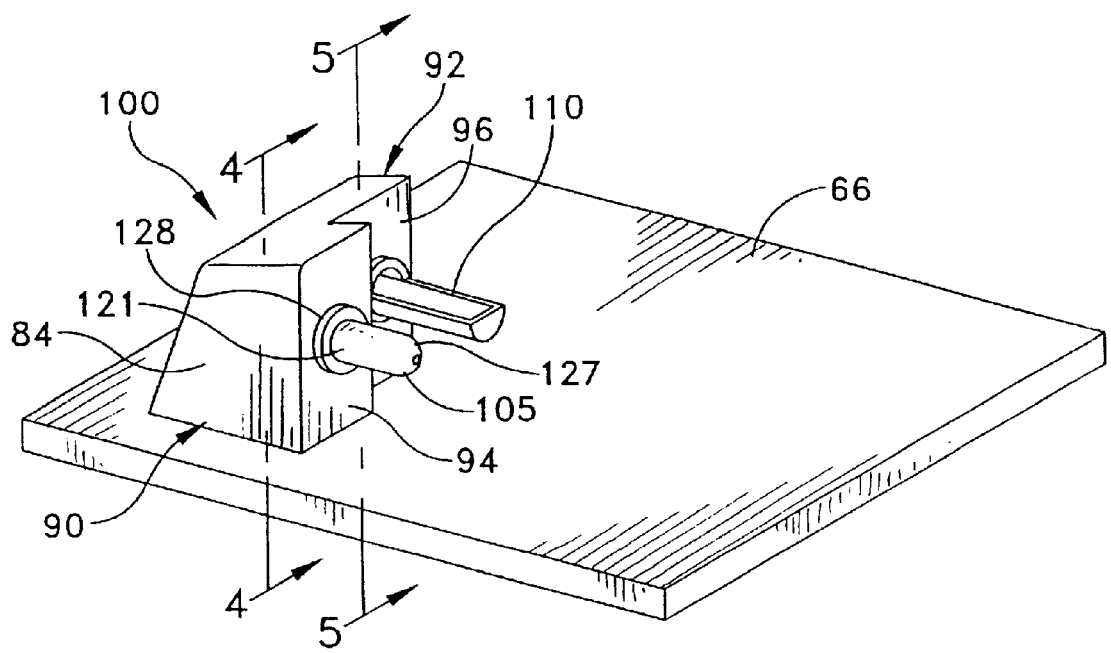
FIG. 7 is a perspective view of the tank cover shown in FIG. 1.
Figure 10:
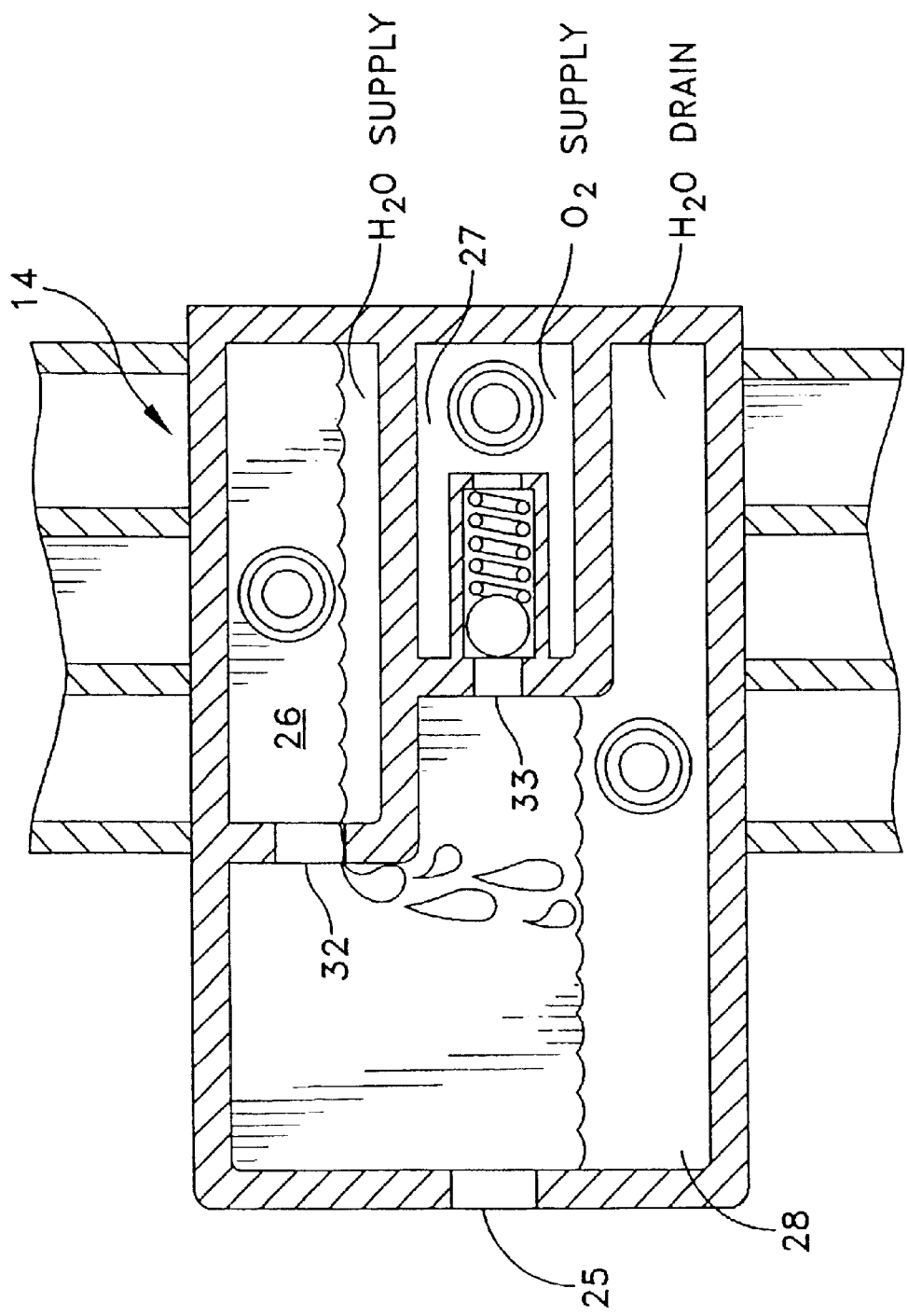
FIG. 10 is a broken-away cross-sectional view of the air and water supply conduit of FIGS. 1 and 2.

FIG. 4 illustrates the drain structures and air supply structures; and FIG. 5 illustrates the water supply structures. The air and water supply structures are alongside one another on header 84 of cover 66 (FIGS. 6 and 7). Each surface 94, 96 includes one opening into cavity 85 that interfaces with fresh water supply passageway 32 of water supply 8, as shown in FIGS. 5 and 10, and a second opening that couples to a pressurized air supply passageway as shown in FIG. 4. A waste water removal passageway is also provided in the multiple lumen conduit (the H2O drain in FIG. 10); however the waste water passageway does not interface with the cover or the tank. Instead, waste water passageway is provided at the utility supply header to remove supply water flowing directly from the supply water passageway when the tank is not inserted in the rack so as to intercept the flow of supply water. This supply flow (FIG. 10) is provided at each tank location, from the water supply passageway to the waste water removal passageway. When the tank is inserted in rack 4 (see FIG. 5), this flow is intercepted and flows into the respective tank 6.

Figure 11:
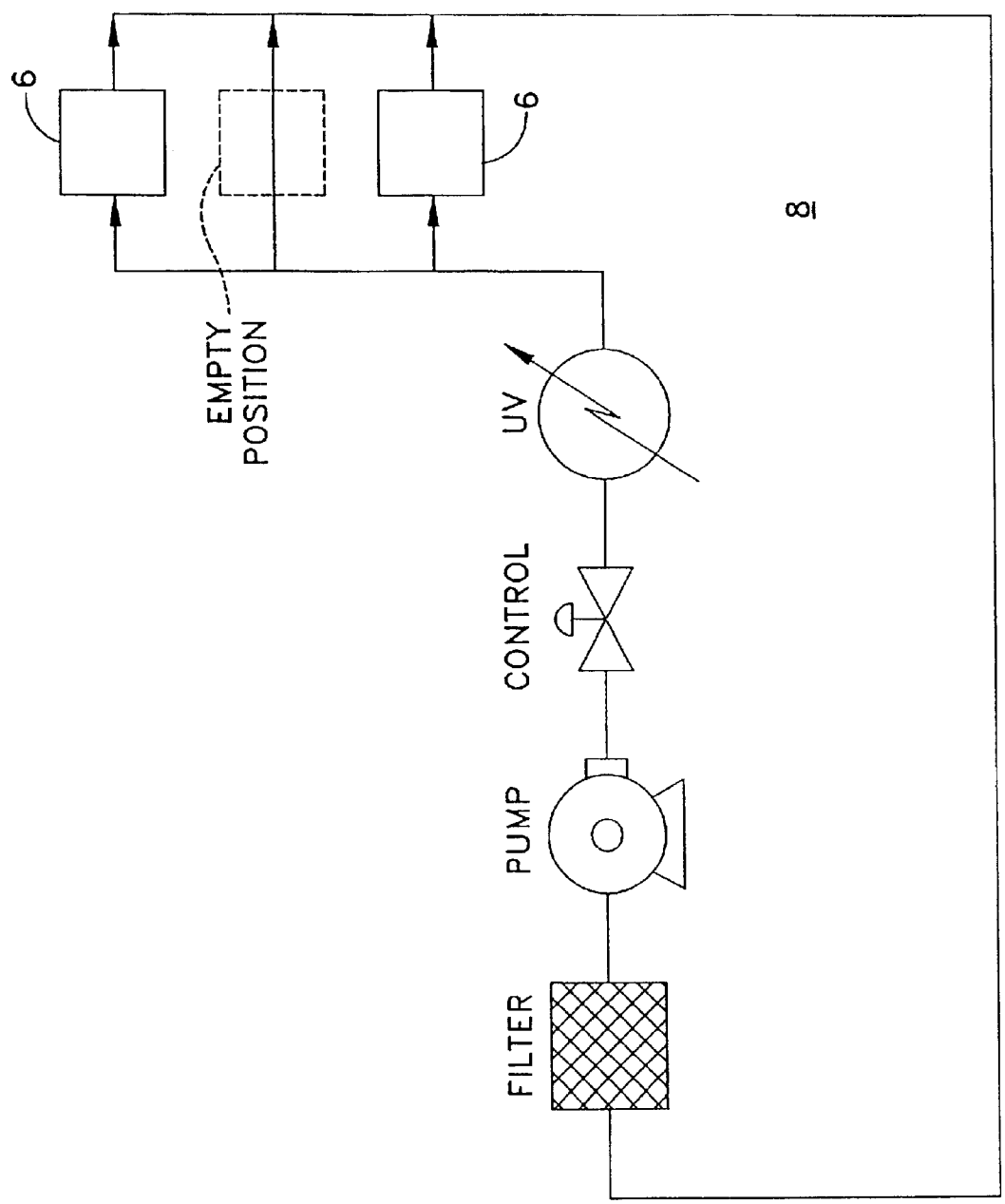
FIG. 11 is a schematic diagram representative of a recirculating water system used in connection with the present invention.

Drainage of waste water from the tank occurs at the other end of the tank at a lower elevation, and leads through a different waste water removal passage back into the water circuit, namely a trough extending along a longitudinal center of the rack as discussed below (see FIGS. 4 and 9). This return path of water is used when the tank 6 is in place in the rack. FIG. 11 schematically illustrates the water flow path, namely a closed circuit including a pump and filter and controls, a biocidal element such as a UV source, and any tanks 6.

Associated with each tank 6, the water circulation system 8 comprises a water and air inlet assembly 100 and a water and waste outlet assembly 200 (see FIGS. 4 and 5). The water inlet is arranged to intersect a flowpath that runs (when the tank is not in place in the rack) between the water supply passageway and the waste water removal passageway, and thereby to supply water for regularly replacing the water in the tank with fresh filtered/purified water. Water and air inlet assembly 100 comprises an aspirator subassembly 105 and a water cradle 110 that are supported by air/water supply header 84 on the tank cover 66. Aspirator subassembly 105 (FIG. 4) includes a spring actuated ball valve 113, a valve engagement coupling 115, and an aspirator tube 118. Spring actuated ball valve 113 comprises a tubular housing 121 (see FIG. 7) having a helical spring 124 (FIG. 4) and a ball-stop positioned within the central passageway of the tubular housing. The tubular housing is cylindrical along a portion of its length and tapers at an distal end where the ball valve is engaged to open the air supply when tank 6 is inserted into the rack. A portion of the outer surface of the tubular housing is threaded and engages with a corresponding portion of the wall 94 of air and water supply conduit 14 that defines an inner portion of pressurized air supply passageway 27.

Valve engagement coupling 115 comprises an elongated tube having an outer diameter that is less than the diameter of the opening defined at tapered outer end 127 of tubular housing 121 (see FIG. 7). A threaded portion 128 of valve engagement coupling 115 engages a corresponding threaded portion of the wall of air/water supply header 84 that defines the opening in surface 94 of air bulkhead 90. An annular sealing flange can be disposed on the outer surface of valve engagement coupling 115, adjacent to threaded portion 128 for sealing purposes. Supply air is fed when the valve is open to aspirator tube 118, namely an elongated having an open upper end that is threaded along the outer surface of the tube, and threads into an elbow fitting 131 within the air bulk head 90. Fitting 131 provides a right-angled passageway and receives the threaded portion of valve engagement coupling 115, substantially along a horizontal axis, and aspirator tube 118 substantially vertically so that aspirator tube 118 projects at least partially under the water level that fills aquarium tank 6.

The water level is maintained (FIG. 4) by discharge from a drain at the rear of tank 6 with a flow path passing the water level, i.e., the tank overflowing by gravity. Inasmuch as tank 6 is tilted inwardly of the rack, the water level falls well below the drain level when tank 6 is removed from the rack and placed on a horizontal support. Additionally, when tank 6 is removed a spring biases ball valve at the drain also closes.

For supply of water (FIGS. 5 and 7), water cradle 110 comprises a semi-tubular structure including an elongated semi-cylindrical portion 136, a tubular portion 139, and an annular sealing flange projecting radially outwardly from the transition between semi-cylindrical portion 136 and tubular portion 139. Tubular portion 139 is threaded on an outer surface for engagement with a corresponding threaded portion of the wall of air/water supply header 84 that defines the opening in surface 96 of water bulkhead 92. Annular sealing flange 141 is sized and shaped so as to sealingly abut surface 96 when water cradle 110 is installed in water bulkhead 92. Semi-cylindrical portion 136 forms a spoon-like receptacle that projects outwardly from the center of annular sealing flange 141 and away from surface 96. Because surface 96 is sloped away from the top surface of cover 66 at an angle greater than the tilt angle of the tank (e.g., about 10 degrees versus 5 degrees), semi-cylindrical portion 136 is oriented at a downwardly sloping angle (equal to the difference between the tank tilt angle and the water bulkhead-to-cover angle). As a result, water that is poured into semi-cylindrical portion 136 flows by gravity along a downward gradient toward water bulkhead 92, into and through tubular portion 139 to feed the tank.

According to the foregoing structure, when the tank 6 is in place in the rack at any tank position, feed water flows into the tank via the structures at the bulkhead 92 rather than flowing from the fresh water supply into the waste water removal passageway associated with the air/water supply conduit at the outer end of the tank. Excess water drains from the tank at the opposite end, which is at the lower elevation, via waste water outlet assembly 200. The waste water outlet assembly draws from a drain inlet near the lowermost point in the tank and discharges by overflowing the tank water level into a waste water drain 210, namely an at-least-partly open longitudinal trough provided at each vertical tier to convey the waste water away. Each conveyor or drain 210 is coupled into the return side of the circulating water flowpath, leading back to the filter and the pump that drives the flow. Wastewater passage 28 also leads back to the return side, although the waste water in passage 124 has not passed through a tank 6.

The waste water outlet assembly 200 is a drainage plumbing assembly and comprises a housing 202, a discharge tube 204, a spring actuated ball valve 206, a tank interface grommet 208, and the waste water drain 210, which comprises a waste water conveyor in the shape of a trough that catches drainage waste water overflowing the tank water level. Housing 202 is sized and shaped to be positioned within an upper portion of aquarium tank 6, adjacent to cover 66 and end wall 62, and in confronting relation to U-shaped opening 70. An internal void or cavity is defined within housing 202 and has right angle openings respectively sized to accept a portion of spring actuated ball valve 206, and arranged in flow communication with a discharge inlet passageway 215, through which water is drained from tank 6. The stop for the ball valve is provided by the discharge tube 204. Discharge inlet tube or passageway 215 projects downwardly from a bottom surface of housing block 202. Discharge inlet passageway 215 and discharge outlet passageway 204 are oriented at approximately ninety degrees to one another, and are in selective flow communication with operation of the ball valve.

The highest point along the drain flow path is approximately at the level of the surface of the water in the tank (FIG. 9), thus providing an overflow orifice or passage along the drain flow path. Anti-siphoning passageway 219 opens onto a top surface of housing 202 so as to be in communication between internal cavity 213 and the ambient atmosphere surrounding housing 202. Passageway 219 prevents a siphoning action that could otherwise lower the water level in the tank below the nominal level defined by the high point of the drain flow path. As thus configured, discharge of spent water from each tank 6 in the rack is driven by gravity and the tank water is regularly exchanged with fresh water.

Figure 8:
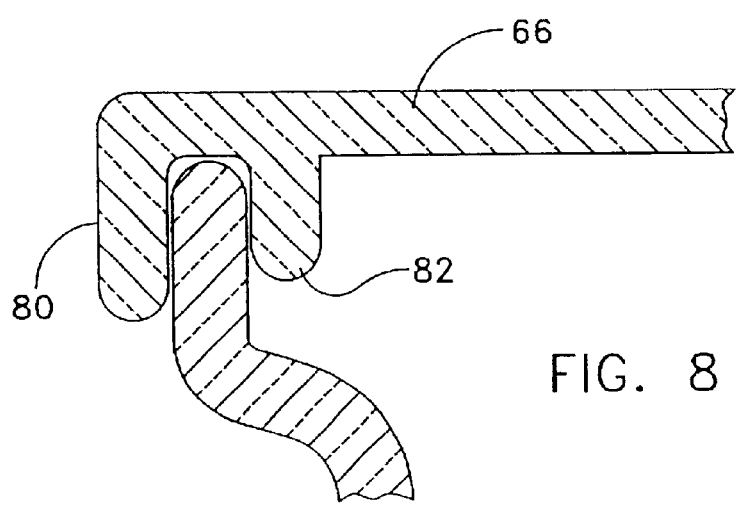
FIG. 8 is a broken away cross-sectional view of the cover of FIG. 1.

The cover on each tank substantially protects the tank from ingress of water spilled from a tank higher in the rack (FIGS. 7–9). To further prevent inadvertent sloshing or other discharge that could subject a lower tank to waste water from an upper tank, the spring biased valve in the waste water discharge from tank 6 closes off the drain flowpath when tank 6 is removed from the rack. More particularly, spring-actuated ball valve 206, comprising a helical spring 224 and a ball-stop defined by the end of tube 204, closes when tank 6 is pulled a short distance along its supporting flanges in the removal direction, as shown on the left side of FIG. 9, or opens when tank 6 is fully inserted as shown on the right side of FIG. 9. Helical spring 224 is disposed in internal cavity 213 and urges the valve body or ball toward ball-stop 226 and a sealing engagement blocking off both discharge inlet passageway 215 and discharge through outlet tube 204. The valve is opened and drainage can occur by pushing back the ball 206 when the tank is fully inserted into the rack, namely via valve operator pin 21 that is fixed in the central structure of the rack and protrudes laterally in the area just above the longitudinal drain trough. Drain tube 204 projects outwardly from the discharge outlet passageway to discharge used or spent water over U-shaped opening 70 and into trough 210.

Tube 204 is cylindrical where it projects from a side of housing 202 and is encompassed by a tank interface grommet 208 that mechanically engages with and seals to U-shaped opening 70. Grommet 208 is made of elastomeric material and has a U-shaped slot around its sides and bottom which fits snugly into opening 70. The grommet has a central opening sealing with tube 204, and preferably also has tabs or ears protruding laterally in opposite directions, the tabs or ears resting on and against tank flange 68 at its outward bend 69. Tank interface grommet 208 is mated with aquarium tank 6 by slidingly engaging inwardly projecting flange 72 of U-shaped opening 70 with the peripheral U-shaped groove along the sides and bottom of grommet 208. At the lower limit of displacement of grommet 208, the grommet ears abut against flange 68 at the top portion of end wall 62 of tank 6.

By mounting the drain assembly in a removable arrangement, it is possible to disassemble this part of the tank for cleaning, for example autoclaving. The tank interface grommet 208, including its U-shaped peripheral slot and the ears that rest on and against tank flange 68, precisely defines the vertical position of the drain tube 215. Positioning by virtue of the grommet provides a means to accurately set the height of the gap between the bottom of the tank and the drain inlet tube 215. In particular, the grommet positions the drain assembly so that the lower end of inlet tube 215 is spaced a short distance, for example 0.125 inch, from the lowermost point in the trough in the bottom of tank 6 by which sediment moves toward the low point and the drain, at the back of the tank. The gap forms a restricted cross sectional dimension of the flow path of water from tank 6 into drain tube 215, and thus locally increases the velocity of the water flow at the gap. This helps to entrain and remove solids that have settled in the tank, and reduces the need for regular cleaning of tank 6 to remove sediment.

Waste water drain 210 comprises a longitudinally elongated trough or upwardly open channel that in the dual sided rack embodiment shown in positioned along the central interior portion of rack 4, below the support beam 12. Rods 21, forming the ball valve operators, are disposed between the supports that project downwardly from lateral beam 16 below the level of the tank-carrying flanges thereof. The trough can be snapped into engagement with lateral beams at spaced points by the brackets formed between the two downwardly projecting supports. Waste water drain 210 is located below drain tubes 228 for all of aquarium tanks 6 assembled in rack 4 so that drain water pours from the drain assemblies into trough 210. A trough 210 is provided for each vertical tier of tanks, all of the troughs draining into conduits or into a common conduit (not shown) at an end of the rack and leading back to the circulating path of the water and to the filter apparatus and water pump.

There are various possible plumbing arrangements for coupling the apparatus into the circulating flow of water and to the air supply to functionally couple the tanks into the necessary flowpaths. For example, the openings of the multiple lumen supply conduit 14 at each tier can be separately connected by flexible tubes or coupling to filtered and purified water supplied at pressure by the circulating pump, to a supply of compressed air and to a negative pressure or gravity fed return line leading to the pump and filter. The conduits can be coupled on one or both sides (and on each side of the rack for the dual-sided embodiment shown) to make these connections. However such an arrangement would involve a rather complex network of tubes and connections. According to an inventive aspect, the embodiment of the invention as shown comprises a vertically oriented multiple lumen conduit that corresponds to and is in flow communication with the corresponding openings of the multiple lumen air/water supply and waste water drain at each vertical level or tier (FIG. 10). In particular, one end of the multiple lumen conduit 14 is capped off by a sealing cover (not shown) that can be affixed by adhesive or heat welding, etc. The opposite end of the multiple lumen conduit 14, namely the end shown in FIG. 10, is capped by a sealed coupling cap that has openings to couple in fluid communication the respective subdivisions of the multiple lumen conduit 14 with corresponding subdivisions of a vertical multiple lumen conduit. The sealing coupling cap is attached by adhesive or welding at a connection end. This coupling cap has flow openings that preferably comprise flanged openings with O-ring seals. Corresponding openings are provided in the vertical multi-lumen conduit, and seal with the flanged openings and O-rings. A bolt can be provided for urging the conduits into sealing engagement at each level or tier. In this arrangement it is only necessary to provide one connection for each of the three lumens of conduit 14 for each side of the rack (or for the whole rack in a one-sided version). A similar conduit (not shown) can couple to the ends of drain troughs 210 at least at one side of the rack and at each level. That connection can be made by a vertical conduit with space holes into which the troughs 210 extend.

In the embodiment shown, the water supply, waste water drain and air supply couplings are all made to the multiple lumen conduit on the same end, which provides a neat and compact arrangement because it is only necessary to make connections to the vertical multiple lumen conduit, e.g., at the bottom or top, to couple that side of the rack into the circulating flow path. It is also possible to make some of the connections at one end (e.g., the supplies of air and water) and others at the opposite end (the waste water drain) such that certain flows move in opposite directions. In lieu of multiple lumen conduits as discussed herein, it is also possible to arrange the same flow connections using separate (or attached) single lumen conduits for each separate flow at each tier.

According to an inventive aspect, the structural parts of the device are readily put together and taken apart. Thus the user can generally determine which end of the rack should have couplings, how many levels or tiers will be included, the longitudinal length of the rack and similar aspects of a particular installation. For example if the utility (air/water/drain) connections are to be moved to the opposite side of the rack, their conduits can be moved from one side of the rack to the other and reversed end for end.

Referring to FIG. 1, a standardized unit is also possible, namely having a particular width and number of tiers, and in the embodiment shown, a roll-out shelf in the middle (shown in broken lines) for servicing tanks, such as transferring subjects from one tank to another. The ability to couple the lateral beams 16 to longitudinal members 12 also permits mixing single width tanks and multiple width tanks, as shown by the double width tank in the bottom tier of FIG. 1. For this purpose one or more lateral beams can be detached and slid along members 12 to abut against the adjacent beam.

Preferably, the water circulation system runs at a constant flow rate for changing the water in all the tanks at approximately the same frequency. The circulation system is driven with sufficient power to produce a positive pressure in the water supply conduits and a negative pressure in the drain conduits, as necessary to drive the flow. However the vertical spacing of the tiers provides a fluid head that affects the pressures at each level. That is, the weight of the volume of water that is higher in the rack bears on the conduits at lower elevation. In an extreme case, the rate of supply water flow could be substantially higher at the lower tiers and the rate of drainage substantially higher at the upper tiers. This situation can be remedied in a number of ways. The dimensions of the conduits can be arranged such that the orifices between the vertical and horizontal conduits are small in cross section compared to the vertical multiple lumen conduit, which causes the vertical conduit to act as a header or weir pipe arrangement. The driving pressures can be relatively high compared to the difference in pressure due to fluid head, which tends to equalize the flow rates at the respective tiers. As another alternative, progressively greater restrictions can be placed in the supply lines at lower elevations and/or the drain lines at higher elevations to balance the effect and achieve equal flow. Provided the drain negative pressure is sufficient to achieve a positive flow at least equal to the supply flow, it is normally only necessary to adjust for the flow rate on the supply side. Adjusting the rate of water supply inherently governs the rate of total flow in the drains because only that amount is available to drain. The volume of the flow draining through the drain passageways of the multi-lumen horizontal conduits versus the volume draining through the rear drain troughs varies as a function of the proportion of tank locations that are occupied by tanks. With no tanks in the rack, all the drain flow is through the multi-lumen conduits. With all tank positions occupied, most or all of the drain flow is through the rear trough.

The flow in the horizontal conduits (both in the multiple lumen conduits and in the rear drain trough) is gravity flow rather than pressure driven, because these conduits are open to the ambient and operate at ambient pressure. To effect gravity flow, the drain conduits are preferably tilted slightly toward one end of the rack, and all the drain connections are made there. The tilt can be obtained by placing the support positions on one end of the rack higher than the other but keeping the end supporting structures vertical such that the vertical and horizontal members form a parallelogram. Alternatively, the connected vertical and horizontal members can be at precise right angles and the overall structure tilted toward one end or the other by providing a spacer under one end.

It is an aspect of the housing apparatus as disclosed that substantially all the surfaces that are in contact with the water on the supply and drain sides can be substantially free of metal surfaces. Metal ions can be toxic to some aquatic animals and plants.

The invention is not intended to be limited to the particular arrangements discussed above as examples and shown in the drawings, but also encompasses reasonable modifications and equivalents within the scope of the appended claims, which define the scope of exclusive rights that are claimed.

What is claimed is:

1. An aquarium system, comprising:
   a tank having an inside bottom sloping to at least one point of lowest elevation;
   a water supply to the tank;
   a water drain from the tank, the water drain having a drain inlet at said point of lowest elevation, whereby sediment is drawn into the drain inlet;
   wherein the tank has inside walls sloping to an elongated trough in the inside bottom, and further comprising a support for the tank positioned to tilt the elongated trough downwardly to one end thereof, and wherein said point of lowest elevation is at said end of the trough.

2. The aquarium system of claim 1, wherein the trough is substantially parallel to a supporting surface for the tank and further comprising rack having a plurality of tilting supports for engaging said supporting surface to support the tank.

3. The aquarium system of claim 2, wherein said water drain comprises a drain outlet at an elevation substantially defining a water level in the tank, the drain outlet discharging into a waste water collection conduit, and wherein the waste water collection conduit water is coupled to the water supply in a recirculating flowpath passing through at least one pump and at least one water purifying device.

4. The aquarium system of claim 3, wherein the water supply comprises a flow path along which feed water flows along at least one path between the water purifying device and the waste water collection conduit, further comprising a supply inlet to the tank positioned to intercept the feed water flowing along the at least one path when the tank is carried on said support, and wherein the feed water flows directly to the waste water collection conduit when the tank is removed from said support.

5. The aquarium system of claim 4, comprising a rack for supporting a plurality of said tanks, the rack having attached lateral and longitudinal members, the tanks each having flanges protruding therefrom, the lateral members of the rack comprising flanges tilting downwardly and inwardly of the rack, the flanges of adjacent said lateral members supporting the tanks by the flanges of the tanks and defining a plurality of tank positions on the rack; wherein the waste water collection conduit includes a longitudinally elongated trough disposed inwardly on the rack at a relatively lower elevation for catching water drained from the tanks; and a paired water supply conduit and water collection conduit are disposed outwardly on the rack at a relatively higher elevation, said supply inlet to the tank intercepting water flow between said paired water supply conduit and said water collection conduit disposed outwardly on the rack at each position.

6. The aquarium system of claim 5, further comprising vertical connection conduits coupling the paired water supply conduit and the water collection conduit to the recirculating flowpath, and wherein the paired water supply conduit and water collection conduit are defined by passages in a multi-lumen conduit having an additional passage coupled to a supply of compressed air and operable to aerate water in tanks placed in the rack.

7. The aquarium system of claim 2, further comprising a removable cover for an open top of said tank, and wherein the cover has a raised portion supporting the supply inlet in position to provide a gravity flow into the tank when carried on the support.

8. The aquarium system of claim 7, wherein said cover comprises an internal lip protruding downwardly around a perimeter adjacent to a rim of the open top of the tank, the lip providing a low point for condensation to accumulate and drop into the tank.

9. An aquatic housing system comprising:
   a tank frame;
   a tank disposed on said tank frame;

a water distributor supported by said frame for supplying a continuous flow of water to the tank;

a drainage plumbing assembly coupled with the tank and positioned to capture water overflow from the tank caused by said continuous water flow and being selectively operable to drain water from the tank, wherein the tank has an overflow orifice and a drain orifice coupled with the drainage plumbing assembly, wherein the tank has a top, a side wall and a bottom, and wherein the overflow orifice is located in the side wall near the top and the drain orifice is located in the side wall near the bottom, wherein the tank and/or frame are dimensioned so that the tank bottom slopes downwardly at a small angle to the horizontal to provide gravity assisted removal of waste from the tank via the drainage plumbing assembly.

10. The aquatic housing system of claim 9, wherein the tank is one of a plurality of substantially identical tanks, wherein the water supply supplies a continuous flow to each of the tanks, and wherein the drainage plumbing assembly is one of a plurality of drainage plumbing assemblies each coupled with the overflow orifice and the drainage orifice of different ones of the tanks.

11. The aquatic housing system of claim 10, further comprising a drainage conveyor supported by the frame in a position to receive and convey water overflow and drainage away from the drainage plumbing assemblies.

12. The aquatic housing system of claim 9, wherein the frame is dimensioned to provide said angle.

13. The aquatic housing system of claim 9, wherein the drainage plumbing assembly includes a valve that is selectively operable to drain water from the tank.

14. An aquatic housing system comprising:

a tank frame;

a tank disposed on said tank frame;

a water distributor supported by said frame for supplying water to the tank;

a drainage plumbing assembly coupled with the tank and being selectively operable to drain water from the tank; and wherein the tank has a side wall and a bottom, wherein a drainage orifice is located in the side wall near the bottom of the tank, wherein the drainage plumbing includes a drainage connector coupled with the drainage orifice, and wherein the tank and/or frame are dimensioned so that the tank bottom slopes downwardly at a small angle to the horizontal to provide gravity assisted removal of waste from the tank via the drainage plumbing assembly.

15. The aquatic housing system of claim 14, wherein the drainage plumbing assembly includes a valve that is selectively operable to drain water from the tank.

16. The aquatic housing system of claim 14, further comprising a drainage conveyor supported by the frame in a position to receive and convey water overflow and drainage away from the drainage plumbing assemblies.

17. An aquatic housing system comprising:

a tank frame;

a tank disposed on said tank frame;

a water distributor supported by said frame for supplying a continuous flow of water to the tank;

a waste water outlet assembly coupled with the tank and positioned to capture water overflow from the tank caused by said continuous water flow and being selectively operable to drain water from the tank, wherein the tank has a drain into a drain flow path coupled with the waste water outlet assembly, wherein the tank has a top, a side wall and a bottom, and wherein the drain flow path overflows at the side wall near the top and the drain is located at the side wall near the bottom, wherein the tank and/or frame are dimensioned so that the tank bottom slopes downwardly at a small angle to the horizontal to provide gravity assisted removal of waste from the tank via the waste water outlet assembly.

18. The aquatic housing system of claim 17, wherein the tank is one of a plurality of substantially identical tanks, wherein the water supply supplies a continuous flow to each of the tanks, and wherein the waste water outlet assembly is one of a plurality of waste water outlet assemblies each coupled with the overflow orifice and the drainage orifice of different ones of the tanks.

19. The aquatic housing system of claim 18, further comprising a drainage trough supported by the frame in a position to receive and convey water overflow and drainage away from the waste water outlet assemblies.

20. The aquatic housing system of claim 17, wherein the frame is dimensioned to provide said angle.

21. The aquatic housing system of claim 17, wherein the waste water outlet assembly includes a valve that is selectively operable to drain water from the tank.

22. An aquatic housing system comprising:

a tank frame;

a tank disposed on said tank frame;

a water distributor supported by said frame for supplying water to the tank;

a waste water outlet assembly coupled with the tank and being selectively operable to drain water from the tank; and wherein the tank has a side wall and a bottom, wherein a drain opens near the bottom of the tank and the side wall, wherein the waste water outlet assembly includes a connector coupling the drain to the waste water outlet assembly, and wherein the tank and/or frame are dimensioned so that the tank bottom slopes downwardly at a small angle to the horizontal to provide gravity assisted removal of waste from the tank via the waste water outlet.

23. The aquatic housing system of claim 22, wherein the waste water outlet assembly includes a valve that is selectively operable to drain water from the tank.

24. The aquatic housing system of claim 22, further comprising a drainage trough supported by the frame in a position to receive and convey water overflow and drainage away from the waste Water outlet assemblies.

* * * * *